No. 644,641. Patented Mar. 6, 1900.
G. SIBLEY.
DENTAL CHAIR.
(Application filed Jan. 22, 1896.)
(No Model.) 7 Sheets—Sheet 1.

Fig. 1.

Witnesses:
A. V. Groups
A. V. Blackwood

Inventor.
Gideon Sibley
per
John F. Nolan
Attorney.

No. 644,641. Patented Mar. 6, 1900.
G. SIBLEY.
DENTAL CHAIR.
(Application filed Jan. 22, 1896.)
(No Model.) 7 Sheets—Sheet 7.

Witnesses.
A. V. Groups
A. V. Blackwood.

Inventor.
Gideon Sibley
per John F. Nolan
Attorney.

UNITED STATES PATENT OFFICE.

GIDEON SIBLEY, OF PHILADELPHIA, PENNSYLVANIA.

DENTAL CHAIR.

SPECIFICATION forming part of Letters Patent No. 644,641, dated March 6, 1900.

Application filed January 22, 1896. Serial No. 576,452. (No model.)

*To all whom it may concern:*

Be it known that I, GIDEON SIBLEY, a citizen of the United States, residing at the city and county of Philadelphia, in the State of Pennsylvania, have invented certain new and useful Improvements in Dental Chairs, of which the following is a full, clear, and exact description, reference being had to the accompanying drawings, forming a part of this specification.

My improvements, as generally stated, comprehend in a dental chair an extensible seat-supporting standard, novel means for vertically adjusting the same, and novel clamping and releasing mechanism for said standard, whereby advantages are gained, all of which will be hereinafter particularly described and claimed.

In the drawings,
Figure 1 is a side elevation of a chair embodying my improvements.

The numeral 1 designates the usual cylindrical base or pedestal, and 2 a cylinder fitted to the interior thereof. The latter cylinder is provided with a flange 3, that rests upon the upper edge of the pedestal, so as to be rotatable thereon. The upper portion of the rotatable cylinder is extended above the pedestal and is contracted or reduced, as at 4, for the reception of the outer section 5 of a telescopic cylinder, the inner section 6 whereof sustains a chair body or seat. The cylinder thus constitutes an extensible seat-supporting standard.

On one side of the outer telescopic section 5 is a clamp-shoe 7, to be presently explained, which enters a longitudinal groove 8 in the inner section, to the end that when the latter section is extended the shoulder at the lower extremity of the groove will abut against the shoe, and thus effect the elevation of the outer section.

The lower end of the cylinder 2 is provided with a head 9, from the center of which rises a telescopic pipe, comprising in this instance three sections 10, 11, and 12, whereof the largest section 10 is screwed or otherwise fixedly secured to the head, while the upper end of the smallest section 12 is closed by a cap 13, which bears against the upper end of the inner section 6 of the telescopic cylinder, so that if the pipe-sections be extended or telescoped said cylinder will be correspondingly operated in a manner to effect the maximum or the minimum range of vertical adjustment of the chair-body to meet special requirements. Extending through the head 9 is a suitably-valved port 14, which communicates with the vertical cylinder 15 of an appropriate pump, whereby oil or other liquid contained in the pedestal may be drawn into the pump-cylinder. In the type of pump herein illustrated the piston is connected by means of a rod 16 with a rock-arm 17, the fulcrum-stud of which is extended through a suitable bearing on the cylinder and is provided with an appropriate treadle-lever 18. By depressing this lever the downward stroke is imparted to the piston, the reverse stroke being effected by means of a spring-actuated plunger 177, the upper end of which bears against the lower edge of the rock-arm.

In the center of the head 9, immediately below the telescopic pipe, is a recess or chamber 19, which communicates with the port 14 at a point above the inlet-valve, by means of a duct 20, whereby in the downward stroke of the pump-piston the liquid will be forced by way of the duct into the telescopic pipe in a manner to extend the latter and effect the elevation of the chair-body, as below explained. A check-valve 21, located in the duct, prevents the return to the pump-cylinder of the liquid from the telescopic pipe during the reverse stroke of the piston.

To the lower end of the second pipe-section 11 is affixed a depending head 22, provided with an appropriate gasket 23, that is fitted to the first or fixed pipe-section, and to the lower end of the third section 12 is secured an appropriate gasket 24, that is fitted to the second section. The lower end of the head 22, when the sections are collapsed to their lowermost position, enters the recess or chamber 19, the oil in the latter thus serving to cushion the parts in their descent. The head loosely fits the recess or chamber 19, so that the oil in the latter will slowly ooze around and above the head as the head enters such recess or chamber. This head is provided with a central port 25, that leads to the top of the head and communicates, by means of radial ducts 26, with the recess or chamber. Extending from the ducts to the lower end of the head are vertical ports $26^a$, the lower ends of which are normally sealed by means of a flap-valve 27. In the downward stroke of the pump-piston the liquid is forced through the ducts 26 into the port 25, thence into the sections 11 and 12 in a manner to act against the closed upper end of the section 12 and against the opposing end of the gasket 24 thereon, thus elevating said latter section and the cylindrical sections engaged thereby. The section 12 will thus be separately raised until the gasket-ring at the lower end thereof impinges against the head at the upper end of the section 11, whereupon, if the operation be continued, the latter section will be elevated. The initial elevation of the section 11 will obviously occur in virtue of the action of the oil not only upon the end of the gasket 24 but upon the closed upper end of the section 12, the area of the surfaces thus acted upon being greater than that of the upper surface of the head at the lower end of the section 11. When the bottom of the head 22 in its ascent passes the duct 20, the liquid acts directly against the lower end of such end, courses around the same to the ducts 26 and the port 25 in a manner to enter the several pipe-sections and insure their extension. In consequence the cylindrical sections and, perforce, the chair-body are correspondingly extended. It will be seen that during the initial upward movement of the section 11 the valve 27 on the depending head will be opened by the attendant suction, thus affording a vent through the ports $26^a$, which obviates the liability of a vacuum with its disadvantages being formed below the head during such initial movement. Rising centrally from the head into the pipe-sections is a rod 28, which tends to reduce the internal area of the first pipe-section, and thus effect a more uniform distribution of the oil throughout the several sections. Moreover, the enlarged upper end 29 of this rod as it enters the cap on the section 12 upon the descent of the chair acts upon the opposing liquid with a cushion-like result.

Leading from the duct 20 in the head 9 to the under side of the latter is a duct 30, a release-valve 31 being interposed between said ducts. Preparatory to lowering the chair this valve is opened, so as to permit the escape of the oil from the pipe-sections, the descent of the chair-body being arrested at any predetermined point by the closing of the valve. The valve-stem is supported in a standard 32 and is maintained normally depressed—i. e., closed—by the action of a suitably-arranged spring 33. The upper end of this stem extends through the slotted inner arm 34 of a lever that is fulcrumed in a suitable bearing on the side of the rotatable cylinder 2, the other arm 35 of the lever extending outwardly and constituting a treadle. On the end of the valve-stem is a head or stop 36, against which the inner arm of the lever acts when the outer arm thereof is depressed, thereby raising the valve-stem against the compression of the spring for the purpose stated. The lever-arm 34 also operates to effect the release of certain braking or clamping mechanism, which I shall now proceed to describe, reference being had to Figs. 2, 3, 4, 5, 8, and 9 of the drawings, as follows:

Extending rearwardly from the upper or reduced portion of the cylinder 2 are two parallel webs or walls 37, in which is mounted a rock-shaft 38, carrying a lever $a$ of peculiar construction—that is to say, 39 is an upwardly-extending bifurcated arm, the hub 40 of which is loosely mounted on the rock-shaft, and 41 is a laterally-extending arm adjustably connected with the hub, so that the arms may be nicely adjusted in respect to each other. In the present instance the arm 41 is provided with ears 42, that are loosely mounted on the rock-shaft, a spring 43 being interposed between such arm and a forwardly-extending lug on the hub, and a screw 44 being fitted to a depending lug on the hub in a manner to bear against the opposing side of the arm, so that by manipulating the screw the relative adjustments of the lever-arms may be effected.

Fitted to longitudinal slots in the two members of the arm 39 are blocks 45, carrying a shaft 46, on which are freely mounted side by side three rollers 47 48, the central one of which is slightly larger than the others. Resting upon the central roller 47 is the inclined end of an arm 49, the other end thereof being perforated to receive a vertically-movable rod 50, so that when the lever is properly actuated the roller bears against the opposing end of the arm, tilts it in a manner to take against and clamp the rod, and thus effect slight upward movement of the latter. The arm is held normally depressed by the action thereon of a spring 51 in an adjacent bracket 52.

The rollers 48 bear upon the inclined surface of a cam-lever 53, that is fulcrumed to a bracket 54 on the wall of the rotatable cylinder in such manner that upon the operation of the lever-arm 39 the cam-lever is actuated. Pivoted to the upper end of the rod 50 is one arm of a cam-lever 55, that is fulcrumed between projecting lugs on the outer telescopic section 5, near the top thereof. The inner or cam-shaped arm of this lever acts upon the beveled edge of the shoe 7, above referred to, in such wise that when the rod is raised through the action of the arm 49 the cam-lever forces the shoe firmly against the inner section 6 and when the rod is freed from the binding action of said arm the cam-lever releases the shoe and permits the vertical adjustment of the inner section to be had.

Fitted to a longitudinal groove 56 in the outer telescopic section 5 is a shoe 57, the ends of which are oppositely inclined, as shown. The upper inclined end is in contact with a correspondingly-inclined surface on the bracket 54, while the lower end engages the inclined part of the cam-lever 53, above mentioned. Hence when this lever is actuated by the rollers 48 its inner arm raises the shoe 57 forcibly against the opposed incline on the bracket, whereupon the shoe is clamped tightly against the section to hold it in position.

On one end of the shaft 38 is loosely mounted a lever $b$, one arm, 58, of which extends forwardly under the lever-arm 41 and is connected therewith by means of a stout spring 59, whereby, under certain conditions, the levers may be moved as a unit. The other arm, 60, of the lever depends in the path of a toe on the rock-arm 17, above described, to the end that when the pump-piston is raised the toe bears against the arm and effects the movement of the levers in the direction indicated by the arrow, Fig. 2, whereupon the shoes are simultaneously clamped against the respective sections 5 and 6. Upon the downstroke of the piston to effect the elevation of the chair-body the rock-arm 17 is disengaged from the lever-arm 60, whereupon the cam members and their coacting parts resume their normal position, so as to free the sections from the clamping-pressure and permit their extension by the fluid-pressure. Hence in each reciprocation of the piston the sections are successively clamped and released. It will be obvious that even though the rock-arm 17 be disengaged from the lever-arm 60 the shoes will bear yieldingly against the respective sections, but not with sufficient force, of course, to interfere with the action of the fluid-pressure.

Pivoted to the under side of the lever-arm 41 is a rod 61, which depends through the bifurcated lever-arm 34, being provided with a suitably-located collar against which the lever-arm acts when the outer or treadle arm of the lever is depressed to open the release-valve hereinbefore described, the rod 61 and, perforce, the lever-arm 41 thus being raised against the action of the spring 59, in which case the cylinder-sections are unclamped, even though the pump-piston be in the raised position.

If other means than the pump and liquid were used for elevating the chair, the above-described operation of the clamp devices would be the same, the elevating mechanism, of course, being constructed to act upon the lever $b$ similarly to and for a like purpose as the rock-arm of the piston-rod. It will therefore be understood that such devices are not restricted in their use to a chair wherein a pump is employed.

It will be apparent from the foregoing-described construction that the pump and other parts and mechanisms of the chair are bodily rotatable upon the pedestal.

Figure 1:
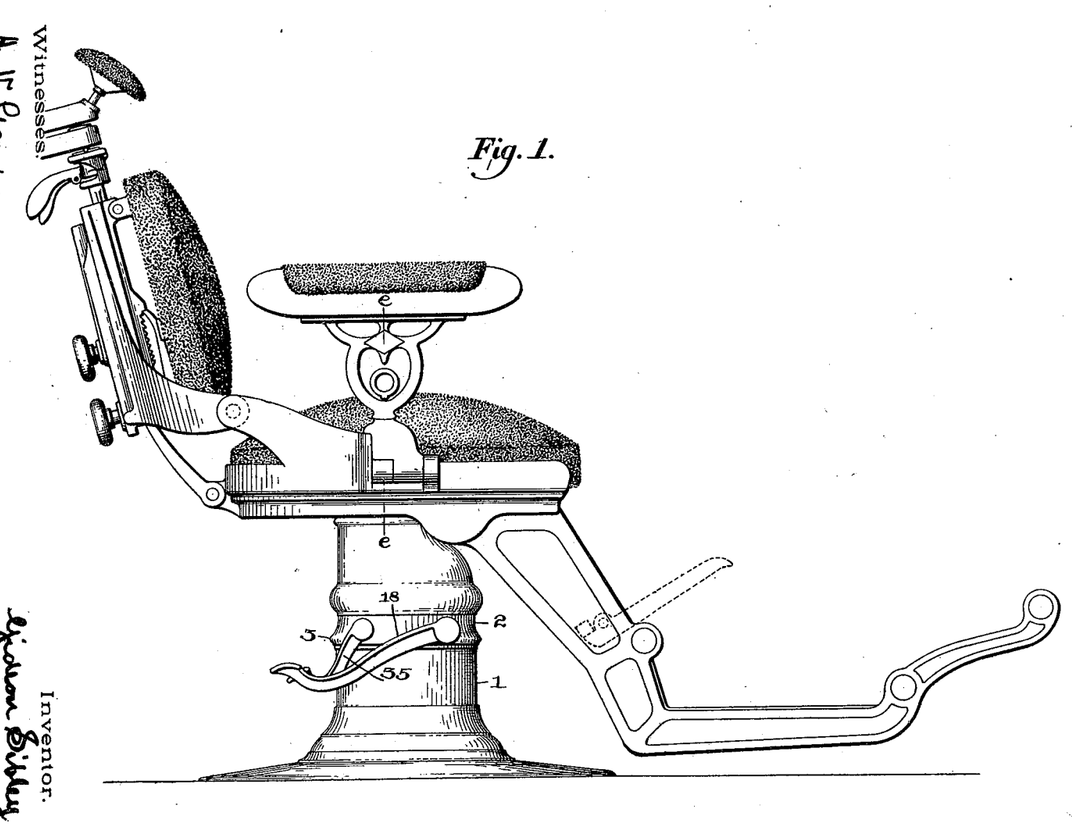
Figure 2:
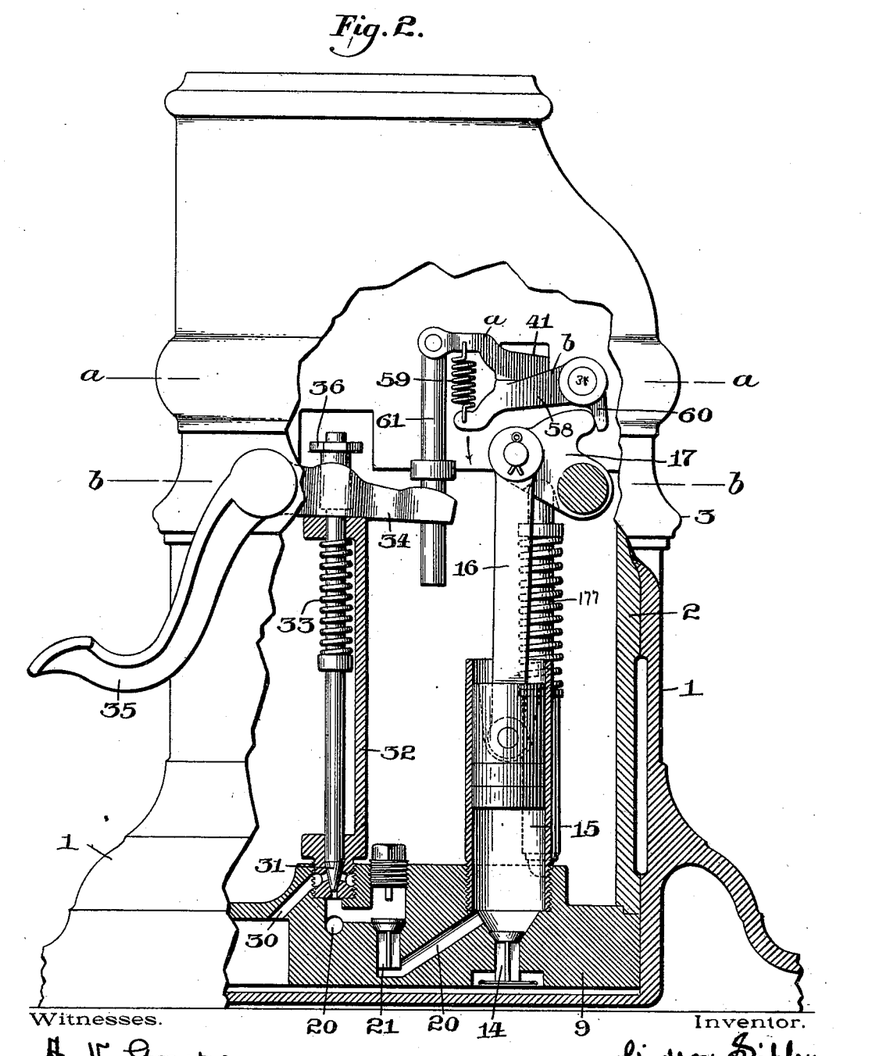
Fig. 2 is a sectional elevation of the base or pedestal and the cylinder rotatably supported thereon, showing the means for controlling the extensible seat-supporting standard.
Figure 3:
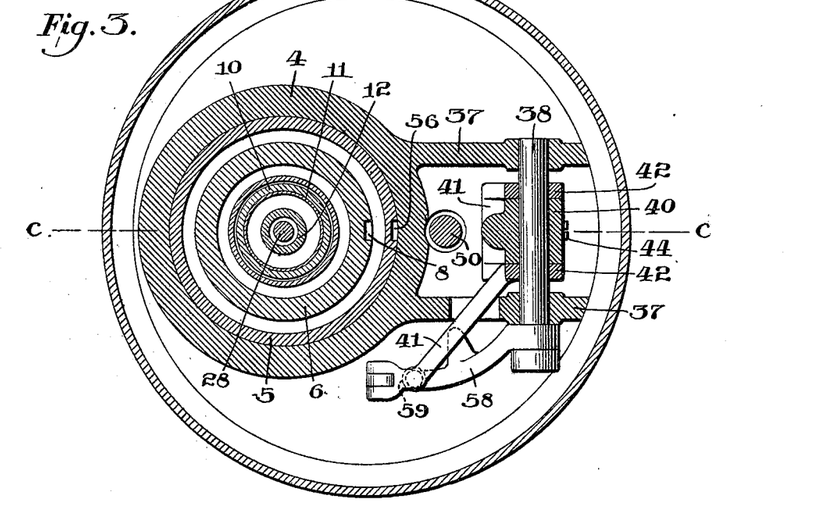
Figs. 3 and 4 are transverse sections as on the lines *a a* and *b b*, respectively, of Fig. 2.
Figure 4:
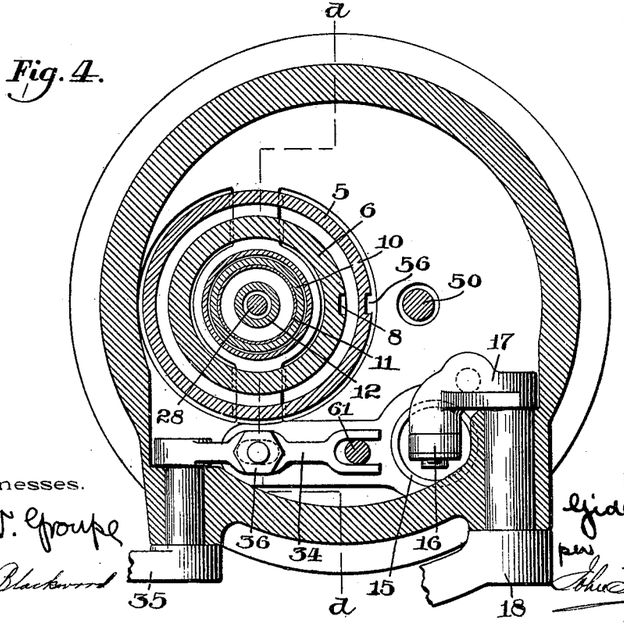
Figure 5:
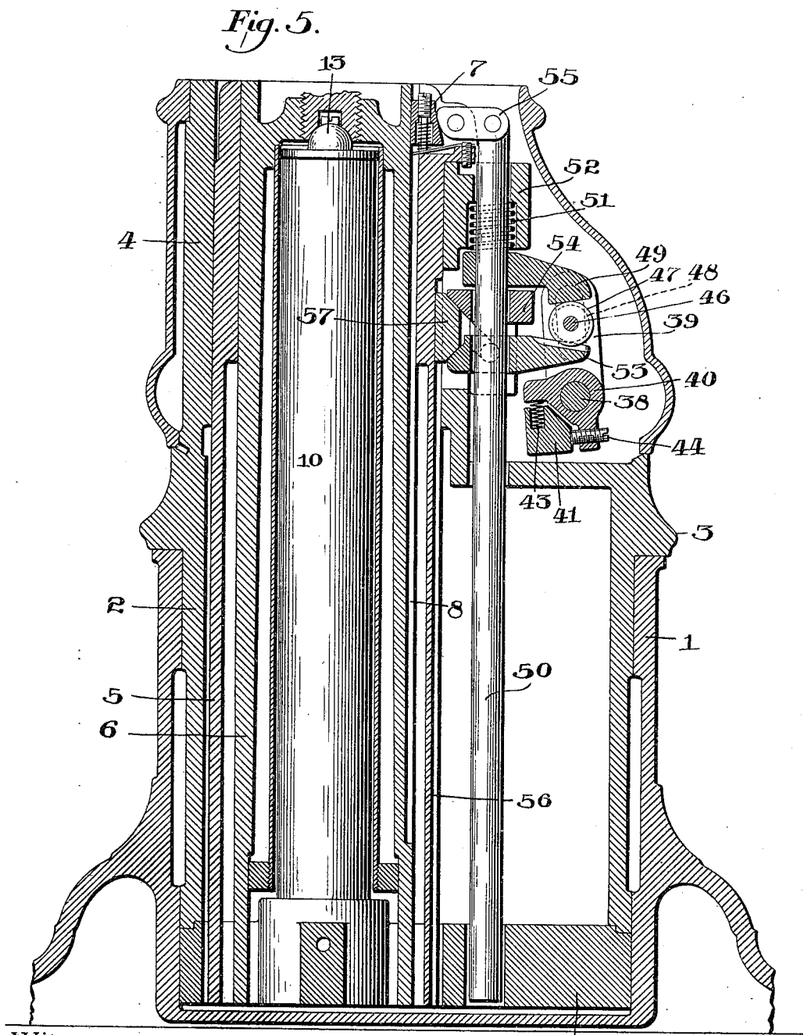
Fig. 5 is a longitudinal section as on the line *c c* of Fig. 3.
Figure 6:
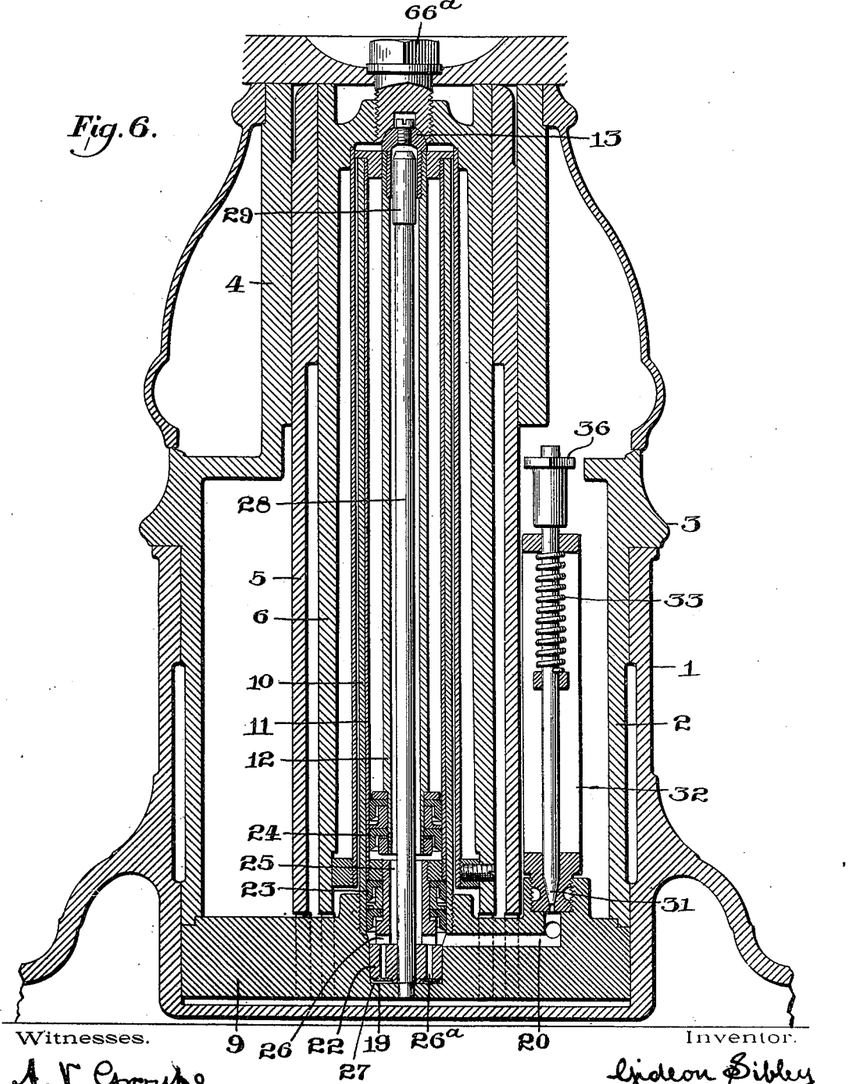
Fig. 6 is a similar section as on the line *d d* of Fig. 4.
Figure 7:
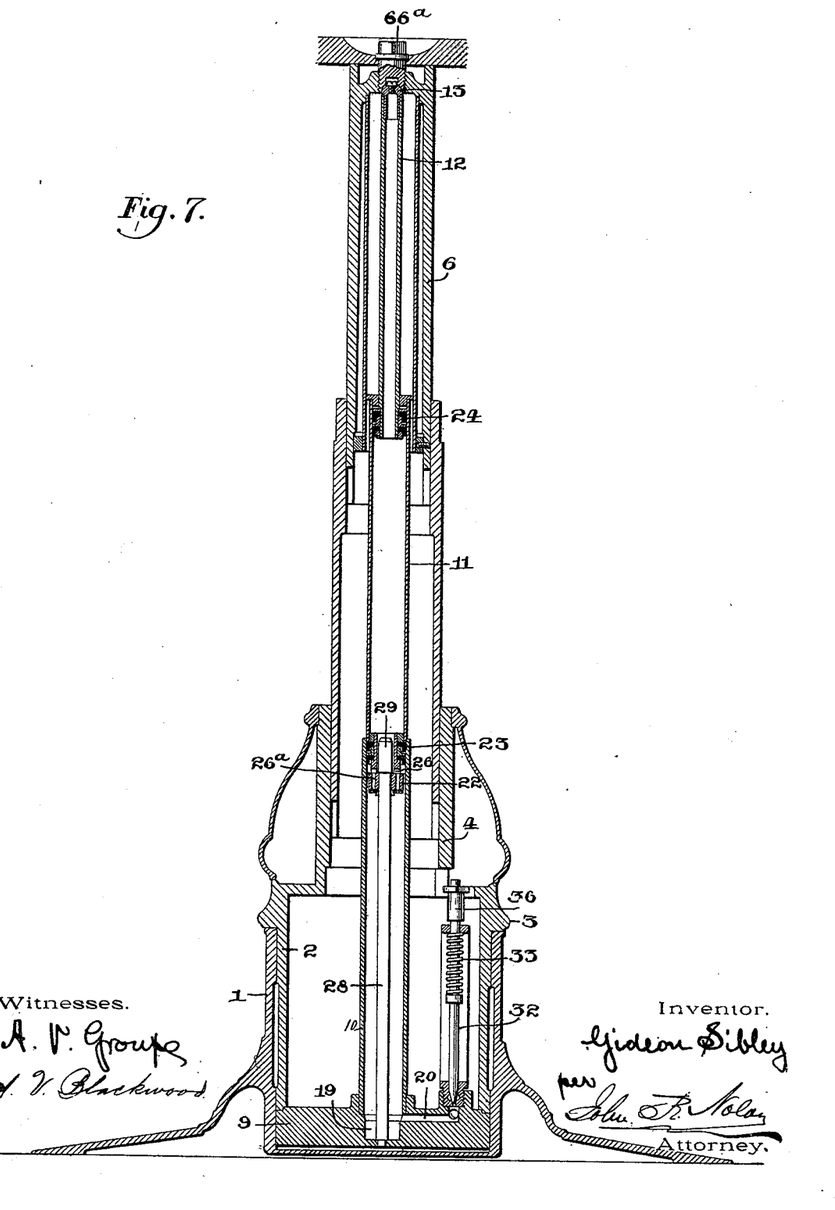
Fig. 7 is a section similar to Fig. 6 extended.
Figure 8:
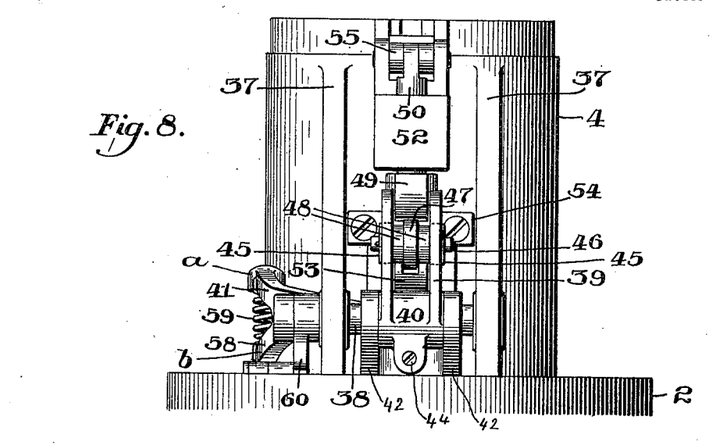
Fig. 8 is an elevation of the upper portion of the rotatable supporting-cylinder with the clamping and releasing mechanism thereon.
Figure 9:
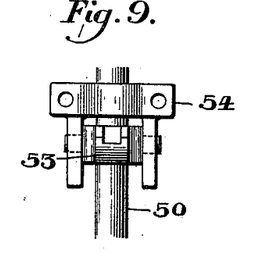
Fig. 9 is a detail in rear view of the lower clamp-lever and adjuncts.
Figure 10:
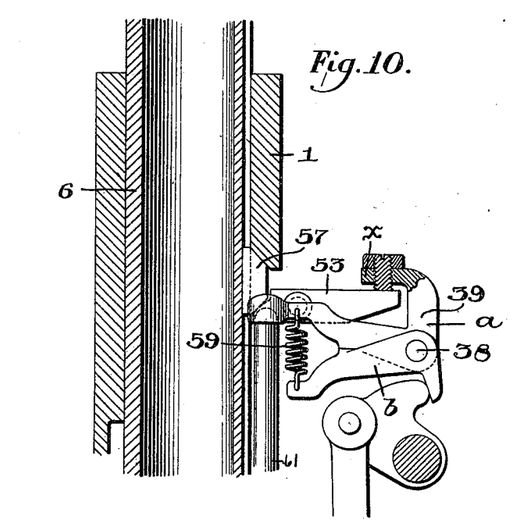
Fig. 10 illustrates a modification of the clamping mechanism as applied to a single seat-lifting section.

In Fig. 10 is shown a construction wherein a clamp for a single seat-supporting cylinder is employed, 1 designating the pedestal, 6 the cylinder mounted therein, and 57 the beveled clamp-shoe fitted to a longitudinal groove in the cylinder. The upper beveled portion of the shoe acts against the correspondingly-beveled portion of the pedestal, while the lower portion of the shoe is engaged by the inner beveled arm of the cam-lever 53, similarly to and for a like purpose as the first-described construction. The levers $a$ and $b$ are loosely mounted on the rock-shaft 38 and are connected by a spring 59, the vertical arm 39 of the lever $a$ being provided with a lug $x$, which overhangs the outer arm of the cam-lever 53. A set-screw in this lug bears upon the cam-lever, so that when the lever $a$ is properly operated, either independently of or in conjunction with the lever $b$, the cam-lever is actuated to effect the clamping of the shoe against the cylinder. The independent and conjoint actions of the levers are or may be attained precisely as the same are effected in the duplex clamp arrangement above described.

I make no claim herein to a dental chair comprising, in combination, a base, a chair-seat, a piston-cylinder fixed in the base, a piston or plunger, a movable cylinder extension, packing to prevent oil from being forced between the cylinder and movable cylinder extension, and means whereby the extension may be moved by the piston, said packing being secured to the foot of the cylinder extension and provided with an opening to permit the passage of oil to the piston and perforations adjacent the lower end of said packing for the oil to enter said passage when the said extension is in its lowermost situation.

I claim—

1. In a chair, the combination with the chair-body, of a base or standard provided with a central recess or chamber and a series of telescopic pipe-sections whereof one section is affixed to said base or standard, provisions whereby a movable section of the series is connected with the chair-body, a depending head on the lower end of a movable section of the series adapted to enter said recess or chamber and provided with a port leading to the interior of the latter section, and a pump having operative communication with the fixed section and with said port, together with a rod rising into said fixed section, substantially as described.

2. In a chair, the combination, with an extensible seat-supporting standard, of a base or head provided with a central recess or chamber, a series of telescopic pipe-sections whereof one section is affixed to said base or head, provisions whereby a movable section of the series is engaged with the standard, a depending head on the lower end of a movable section of the series, adapted to enter said recess or chamber and provided with a port leading to the interior of the latter section, and a pump having operative communication with the fixed pipe and with said port together with a rod rising into said fixed pipe, substantially as described.

3. In a chair, the combination, with an extensible seat-supporting standard, of a base or head provided with a recess or chamber, a series of telescopic pipe-sections whereof one section is affixed to said base or head, provisions whereby a movable section of the series is engaged with the standard, a depending head on the lower end of a movable section of the series, adapted to enter said recess or chamber and provided with a port leading to the interior of the latter section and with a port or ports leading to the bottom of the head, a valve for said latter port or ports, and a pump having operative communication with the fixed pipe and with said ports, substantially as described.

4. In a chair, the combination with a support, of a series of telescopic seat-supporting sections fitted thereto, a series of telescopic lifting-sections confined within said first-named sections, means for extending or contracting said lifting-sections, clamp devices for each of said seat-supporting sections, and a common means for operating said clamp devices, substantially as described.

5. In a chair, the combination, with an extensible standard to support the seat, of a normally-active clamp therefor, means for raising and lowering said standard, operative connections between said means and the clamp whereby during the operation of said means the clamp is intermittently actuated, and means for releasing said clamp independently of the raising and lowering means, substantially as described.

6. In a chair, the combination, with an extensible standard, of a clamp therefor, a lever having operative connection with said clamp, an adjacent lever, means yieldingly connecting said levers, means for raising and lowering said standard, operative connections between said means and one of said levers, and independent operating means for the other lever, substantially as described.

7. In a chair, the combination with an extensible standard and means for raising and lowering the same, of a clamp for said standard, a shaft, a lever thereon operatively connected with said clamp, a second lever on the shaft, a spring connecting said levers, and independent operating mechanisms for the respective levers, substantially as described.

8. In a chair, the combination, with an extensible standard and means for raising and lowering the same, of a clamp for said standard, a shaft, a lever thereon, an arm adjacent to said lever, means for adjusting said arm and lever in relation to each other, a second lever on the shaft, a spring connecting said levers, and independent operating mechanisms for the respective levers, substantially as described.

9. In a chair, the combination, with an extensible standard, of a normally-active shoe to clamp the same, a cam-lever acting upon said shoe, a rock-lever having operative connection with said cam-lever, and means for actuating said rock-lever, together with means for raising and lowering said standard, and operative connections between said means and the rock-lever, whereby during the operation of said means the shoe is intermittently actuated, substantially as described.

10. In a chair, the combination, with a support, telescopic seat-supporting sections, shoes to clamp said sections, upper and lower cams to actuate said shoes, a vertically-movable rod depending from the upper cam, a binding-arm on said rod, a lever provided with rollers adapted to act upon said arm and upon the cam-lever, and means for operating said lever at predetermined intervals, substantially as described.

11. In a chair, the combination with a support of an extensible seat-supporting standard, a telescopic raising and lowering pipe therefor, a rod rising into the lower portion of said pipe, and a pump having operative communication with said pipe, substantially as described.

12. In a chair, the combination, with a base or pedestal, and a chair-body, of a telescopic raising and lowering pipe or cylinder, one section of which is affixed to said base or pedestal, and another section of which is connected with said chair-body, a rod rising into the said fixed section, and a pump having operative communication with said pipe or cylinder.

In testimony whereof I have hereunto affixed my signature in the presence of two subscribing witnesses.

GIDEON SIBLEY.

Witnesses:
JOHN R. NOLAN,
ANDREW V. GROUPE.